(12) United States Patent
Iida et al.

(10) Patent No.: US 7,315,385 B2
(45) Date of Patent: Jan. 1, 2008

(54) IMAGE PROCESSING APPARATUS AND METHOD THEREOF

(75) Inventors: Yoshiko Iida, Tokyo (JP); Takeshi Makita, Shizuoka (JP); Osamu Yamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 873 days.

(21) Appl. No.: 09/987,779

(22) Filed: Nov. 16, 2001

(65) Prior Publication Data

US 2002/0060803 A1 May 23, 2002

(30) Foreign Application Priority Data

Nov. 22, 2000 (JP) .............................. 2000-356144

(51) Int. Cl.
```
G06F 3/12       (2006.01)
G06F 15/177     (2006.01)
G06F 15/16      (2006.01)
G06F 15/82      (2006.01)
G06F 7/04       (2006.01)
G06K 1/18       (2006.01)
H04N 1/60       (2006.01)
H04N 1/46       (2006.01)
```

(52) U.S. Cl. ...................... 358/1.13; 358/1.9; 358/530; 358/1.15; 358/448; 358/525

(58) Field of Classification Search ..................... None
See application file for complete search history.

(56) References Cited

U.S. PATENT DOCUMENTS

| | | | | |
|---|---|---|---|---|
| 4,467,438 A | * | 8/1984 | Zerlaut et al. .............. 356/405 |
| 5,272,518 A | * | 12/1993 | Vincent ....................... 356/405 |
| 5,546,195 A | * | 8/1996 | Arai ............................ 358/518 |
| 5,634,092 A | | 5/1997 | Stokes ........................ 395/118 |
| 5,731,988 A | * | 3/1998 | Zandi et al. ................. 382/167 |
| 5,742,296 A | * | 4/1998 | Yamada et al. .............. 345/604 |
| 5,864,364 A | * | 1/1999 | Ohyama et al. ........... 348/211.14 |
| 5,909,512 A | | 6/1999 | Ohshima et al. ............. 382/251 |
| 5,929,906 A | * | 7/1999 | Arai et al. ................. 348/223.1 |
| 5,933,252 A | | 8/1999 | Emori et al. ................. 358/500 |
| 6,333,757 B1 | * | 12/2001 | Faris ............................ 348/60 |
| 6,393,545 B1 | * | 5/2002 | Long et al. ................... 712/34 |
| 6,435,654 B1 | * | 8/2002 | Wang et al. .................. 347/43 |
| 6,571,000 B1 | * | 5/2003 | Rasmussen et al. ......... 382/112 |
| 6,628,822 B1 | * | 9/2003 | Nakabayashi et al. ...... 382/162 |
| 6,781,716 B1 | * | 8/2004 | Yoda .......................... 358/1.9 |
| 6,807,315 B1 | * | 10/2004 | Walmsley et al. .......... 382/263 |
| 6,853,747 B1 | * | 2/2005 | Matsuura et al. ........... 382/167 |

(Continued)

FOREIGN PATENT DOCUMENTS

EP        0 581 590 A2     2/1994

(Continued)

*Primary Examiner*—Twyler Lamb
*Assistant Examiner*—Myles D. Robinson
(74) *Attorney, Agent, or Firm*—Fitzpatrick, Cella, Harper & Scinto

(57) ABSTRACT

Input and output units using different signal processing systems cannot be connected to a single image input apparatus. On the basis of the signal format of image data acquired by the input unit and the signal format of image data that can be processed by the output unit, the signal format of image data to be supplied from the input unit to the output unit is controlled.

5 Claims, 7 Drawing Sheets

U.S. PATENT DOCUMENTS

| | | | |
|---|---|---|---|
| 7,092,119 B1 * | 8/2006 | Hinds et al. | 358/1.9 |
| 7,173,733 B2 * | 2/2007 | Nino et al. | 358/1.9 |
| 7,251,359 B2 * | 7/2007 | Iida et al. | 382/167 |
| 2002/0012461 A1 * | 1/2002 | MacKinnon et al. | 382/164 |
| 2002/0067493 A1 * | 6/2002 | Odagiri et al. | 358/1.9 |
| 2002/0071605 A1 * | 6/2002 | Iida et al. | 382/165 |
| 2002/0113880 A1 * | 8/2002 | Iida et al. | 348/222 |
| 2003/0038954 A1 * | 2/2003 | Odagiri et al. | 358/1.9 |
| 2003/0202194 A1 * | 10/2003 | Torigoe et al. | 358/1.9 |
| 2004/0184671 A1 * | 9/2004 | Fukuda et al. | 382/274 |
| 2005/0083540 A1 * | 4/2005 | Hersch et al. | 358/1.9 |
| 2005/0111017 A1 * | 5/2005 | Takahashi et al. | 358/1.9 |
| 2005/0169518 A1 * | 8/2005 | Boston et al. | 382/162 |
| 2005/0237553 A1 * | 10/2005 | Takahashi et al. | 358/1.9 |
| 2005/0259113 A1 * | 11/2005 | Endo et al. | 345/604 |

FOREIGN PATENT DOCUMENTS

| | | |
|---|---|---|
| EP | 0 616 200 A1 | 9/1994 |
| EP | 961487 A2 * | 12/1999 |
| EP | 1211883 A1 * | 6/2002 |
| JP | 05298437 A * | 11/1993 |
| JP | 2000050097 A * | 2/2000 |
| JP | 2002158886 A * | 5/2002 |

* cited by examiner

FIG. 7

| INPUT SIGNAL FORMAT / OUTPUT SIGNAL FORMAT | COLORIMETRIC FORM | COLORIMETRIC AND SPECTRAL DISTRIBUTION FORM | SPECTRAL DISTRIBUTION FORM |
|---|---|---|---|
| COLORIMETRIC FORM | COLORIMETRIC DATA | COLORIMETRIC DATA | (GENERATE) COLORIMETRIC DATA |
| COLORIMETRIC AND SPECTRAL DISTRIBUTION FORM | IMPOSSIBLE | COLORIMETRIC AND SPECTRAL DISTRIBUTION DATA | (GENERATE) COLORIMETRIC AND SPECTRAL DISTRIBUTION DATA |
| SPECTRAL DISTRIBUTION FORM | IMPOSSIBLE | SPECTRAL DISTRIBUTION DATA | SPECTRAL DISTRIBUTION DATA |

IMAGE PROCESSING APPARATUS AND METHOD THEREOF

FIELD OF THE INVENTION

The present invention relates to an image processing apparatus and method thereof and, more particularly, to image processing based on the relationship between an input system and an output system of an image signal.

BACKGROUND OF THE INVENTION

Along with the recent development of image processing technology, image input apparatuses such as a digital camera for sensing an object and outputting its image signal are showing a remarkable consummation rush.

Image input apparatuses are roughly classified into a type that processes RGB signals as colorimetric data of an object and a type that executes multiple spectral distribution data processing by estimating the colorimetric data of an object illuminated with ambient light using the spectral distribution data of an object and that of the ambient light with which the object is illuminated. The former requires a short processing time and is advantageous in terms of cost because the processing is simple. On the other hand, the latter requires complex processing and therefore is disadvantageous in processing time and cost, though it can realize more accurate color reproduction.

Some apparatuses execute simple RGB/spectral distribution data processing while realizing accurate color reproduction by multiple spectral distribution data pressing by estimating spectral distribution data on the basis of received RGB signals.

In each of the above image input apparatuses, the internal signal processing system is limited to one of the RGB signal processing system, multiple spectral distribution data processing system, and RGB/spectral distribution data processing system, and has input and output units corresponding to one of the processing systems. That is, an image input apparatus having an RGB signal processing system has an RGB input unit and RGB output unit. An image input apparatus having a multiple spectral distribution data processing has a spectral distribution input unit and spectral distribution processing unit. An image input apparatus having an RGB/spectral distribution data processing system has an RGB input unit and RGB/spectral distribution processing unit.

Hence, input and output units for different signal processing systems cannot be connected to a single image input apparatus. For example, an output unit for a spectral distribution data processing system cannot be connected to an input unit for an RGB signal processing system.

SUMMARY OF THE INVENTION

The present invention has been made to solve the above-described problems individually or altogether, and has as its object to provide image processing based on the relationship between the signal processing systems of image input and output units.

In order to achieve the above object, according to a preferred aspect of the present invention, the foregoing object is attained by providing an image processing apparatus comprising: an input unit, arranged to input image data; an output unit, arranged to output the image data to an external device; and a controller, arranged to control a signal format of the image data to be supplied from the input unit to the output unit on the basis of a signal format of image data that can be processed by the output unit.

In a preferred embodiment, the controller acquires information related to an input signal format of image data that can be input by the input unit and information related to an output signal format of the image data that can be processed by the output unit and, on the basis of the acquired information related to the input and output signal formats, controls the signal format of the image data to be supplied from the input unit to the output unit.

According to another aspect of the present invention the foregoing object is attained by providing a converter, arranged to convert the signal format of the image data input from the input unit, wherein when image data having a signal format corresponding to the output signal format is not input from the input unit, the controller supplies image data obtained by converting the signal format by the converter to the output unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a table showing the correlation between the signal formats of input and output systems and the signal formats of image data to be output to the output system.

DETAILED DESCRIPTION OF THE PREFERRED EMBODIMENTS

Image input apparatuses according to the embodiments of the present invention will be described below in detail with reference to the accompanying drawings.

First Embodiment

[Arrangement]

Figure 1:
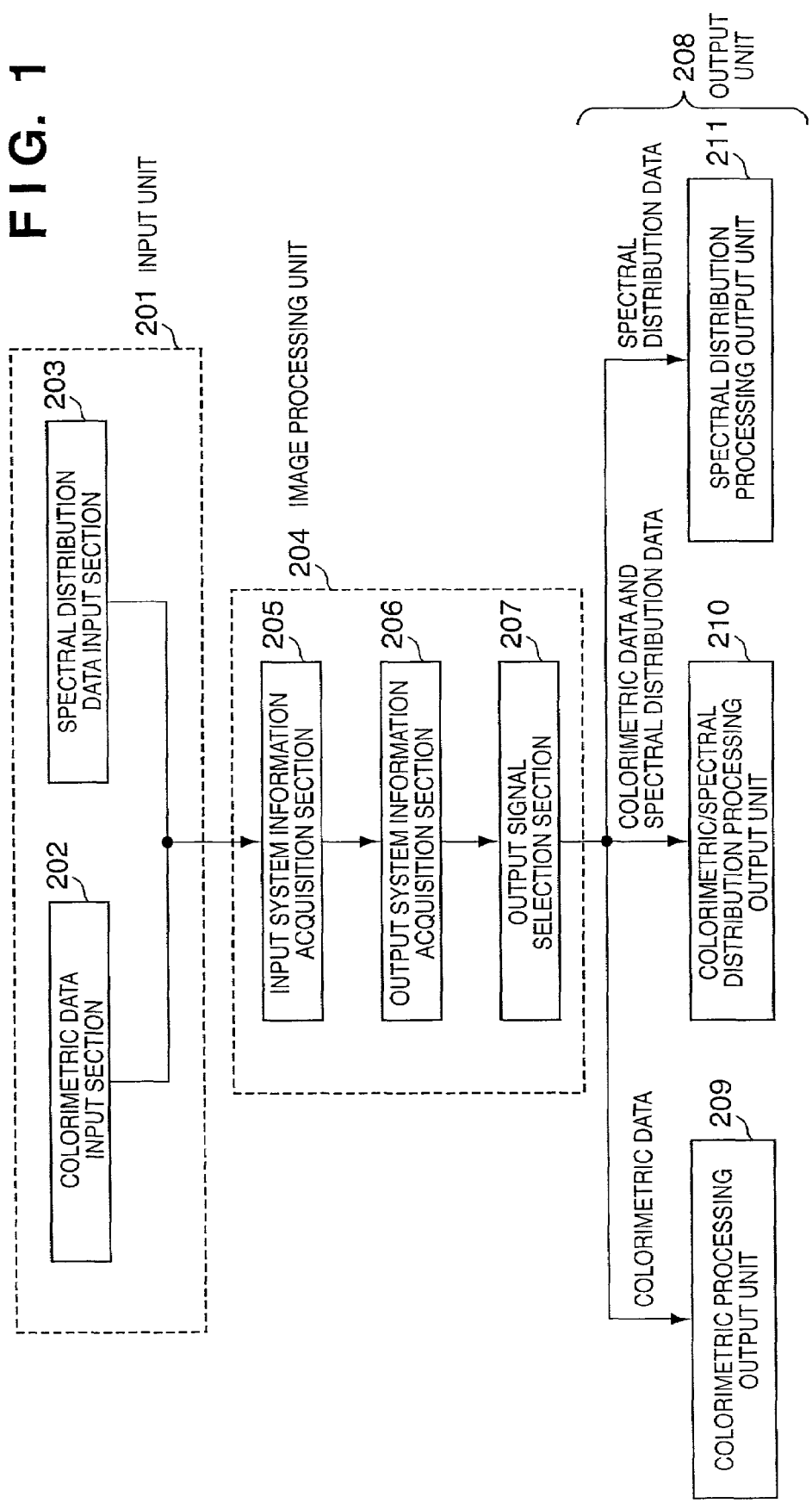
FIG. 1 is a block diagram showing the functional arrangement of an image input apparatus according to the first embodiment.

FIG. 1 is a block diagram showing the functional arrangement of an image input apparatus according to the embodiment.

An input unit 201 for photographing an object and acquiring image data has a colorimetric data input section 202 for acquiring the colorimetric data (RGB data in this embodiment) of each pixel and a spectral distribution data input section 203 for acquiring the spectral distribution data of each pixel. The colorimetric data and spectral distribution data acquired in the input unit 201 are input to an image processing unit 204.

The image processing unit 204 is constituted by an input system information acquisition section 205 for acquiring characteristic information of the input system (to be referred to as "input system information" hereinafter) such as a signal format in the input unit 201 (to be referred to as an "input signal format" hereinafter), an output system information acquisition section 206 for acquiring characteristic information of the output system (to be referred to as "output system information" hereinafter) such as a signal format in an output unit 208 on the output side (to be referred to as an "output signal format" hereinafter), and an output signal selection section 207 for selecting the signal format of image data to be transferred to the output unit 208 on the basis of the acquired input and output system information. The image processing unit 204 outputs image data having a signal format selected by the output signal selection section 207.

The image data output from the image processing unit 204 is subjected to appropriate image processing by the output unit 208 and output to an external device. In the first embodiment, as the output unit 208, a plurality of processing units using different processing signal formats can be used. More specifically, one of a colorimetric processing output unit 209 for receiving only colorimetric data and processing/outputting the data, a colorimetric/spectral distribution processing output unit 210 for receiving both colorimetric data and spectral distribution data and processing/outputting the data, and a spectral distribution processing output unit 211 for receiving only spectral distribution data and processing/outputting the data can be connected to the image processing unit 204 as the output unit 208.

Figure 2:
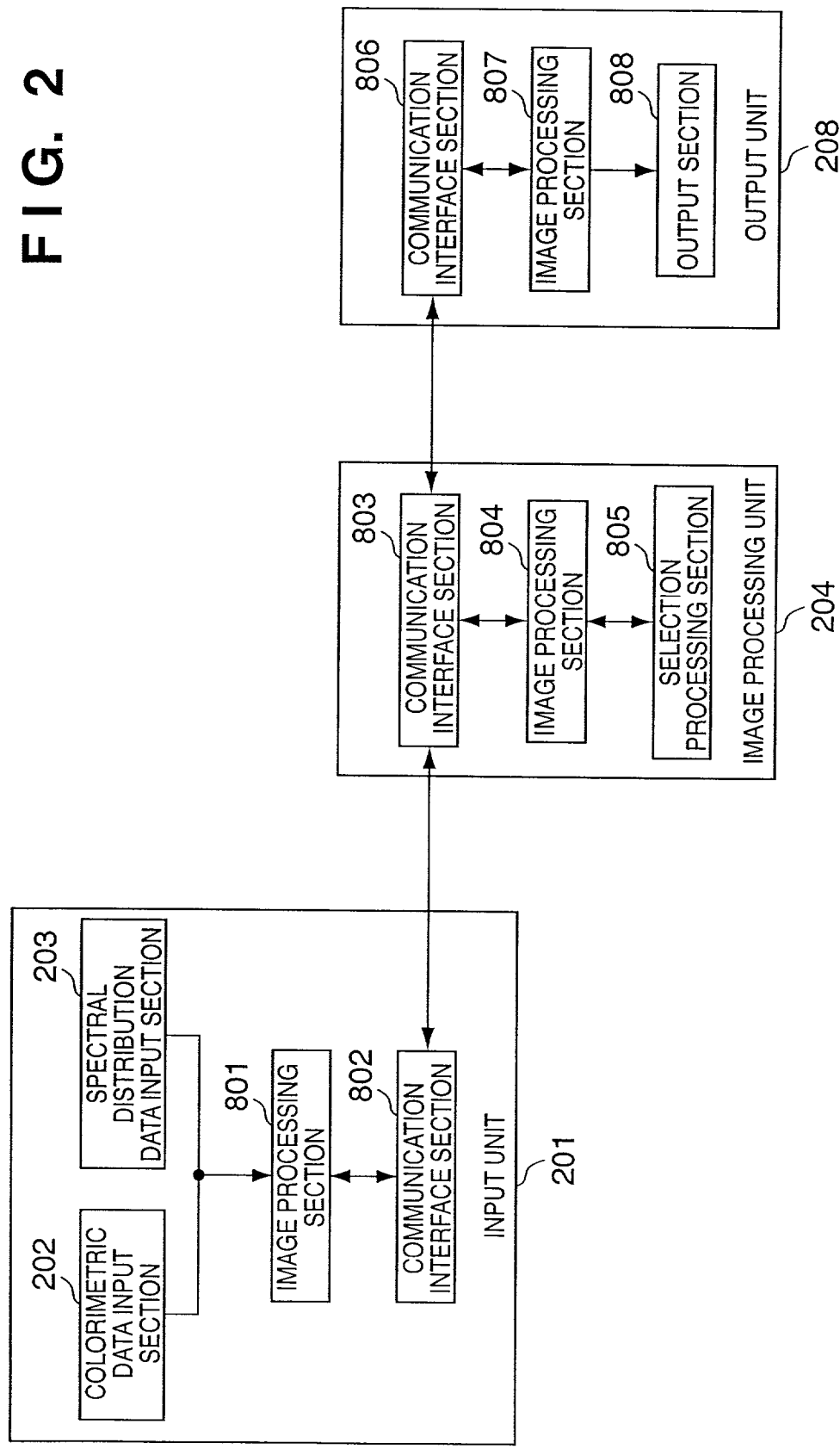
FIG. 2 is a block diagram showing the connection state of each unit.

FIG. 2 is a block diagram showing the connection state of each unit of the image input apparatus shown in FIG. 1.

Referring to FIG. 2, the input unit 201 has, in addition to the above-described colorimetric data input section 202 and spectral distribution data input section 203, an image processing section 801 for executing processing such as analog-to-digital conversion or shading correction for image data having a signal format, which is acquired by the colorimetric data input section 202 and spectral distribution data input section 203, and a communication interface section 802 for transmitting the processed image data to the image processing unit 204 on the output side.

The image processing unit 204 has, in addition to a selection processing section 805 formed from the above-described input system information acquisition section 205, output system information acquisition section 206, and output signal selection section 207, an image processing section 804 for executing image processing according to the signal format selected by the selection processing section 805 on the image data, and a communication interface section 803 for transmitting the processed image data to the output unit 208 and receiving image data from the input unit 201.

The output unit 208 has a communication interface section 806 for receiving image data from the image processing unit 204, an image processing section 807 for analyzing received image data and generating output image data, and an output section 808 for outputting the generated output image data to an external device (not shown).

As shown in FIG. 2, the units (input unit 201, image processing unit 204, and output unit 208) of the image input apparatus according to the first embodiment can exchange image data and the characteristic information of each unit through the communication interface sections 802, 803, and 806.

[Processing]

Image input processing in the above-described image input apparatus according to the first embodiment will be described below in detail with reference to FIG. 3.

Figure 3:
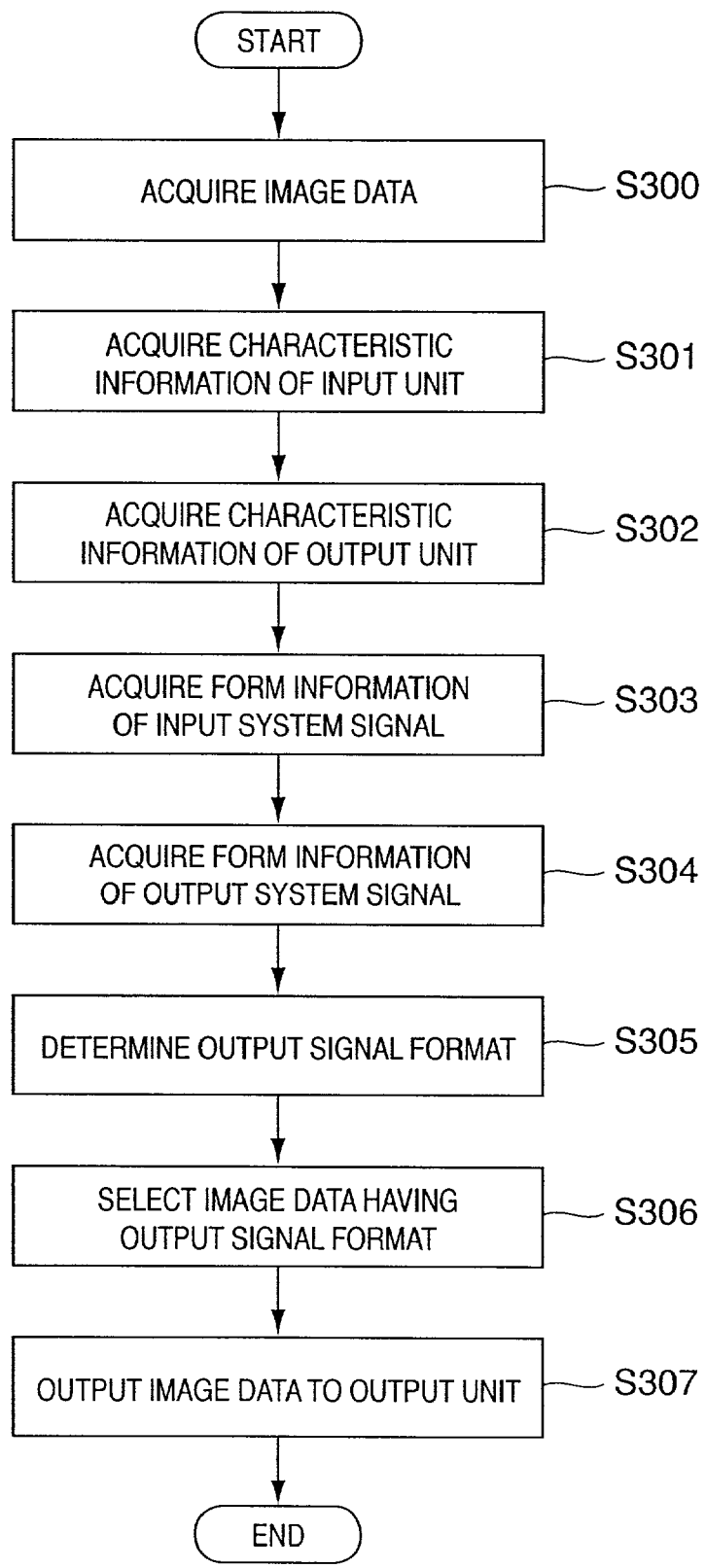
FIG. 3 is a flow chart showing image input processing.

FIG. 3 is a flow chart showing processing of causing the input unit 201 to receive colorimetric data and spectral distribution data and output image data having a signal format that can be processed by the output unit 208.

In step S300, the input unit 201 acquires image data obtained by photographing an object. In the first embodiment, colorimetric data and spectral distribution data are acquired by the colorimetric data input section 202 and spectral distribution data input section 203, respectively.

In step S301, the input system information acquisition section 205 acquires the input system information of the input unit 201. In step S302, the output system information acquisition section 206 acquires the output system information of the output unit 208. That is, the characteristic information of each of the colorimetric data input section 202 and spectral distribution data input section 203 in the input unit 201 is acquired as input system information, and the characteristic information of the output unit 208 currently connected to the image processing unit 204, i.e., the colorimetric processing output unit 209, colorimetric/spectral distribution processing output unit 210, or spectral distribution processing output unit 211 is acquired as output system information.

To cause the output unit 208 connected to the image processing unit 204 to process and output the image data acquired in step S300, processing in steps S303 to S307 is executed by the output signal selection section 207, and image data having a signal format to be output to the output unit 208 is selected from the image data acquired by the input unit 201. Processing in the output signal selection section 207 will be described below.

In step S303, on the basis of the input system information acquired in step S301, pieces of information related to the input signal formats of the image data acquired by the input unit 201 are obtained. The input signal formats mean the signal formats of the image data acquired by the input unit 201, i.e., a "colorimetric form" corresponding to the image data acquired by the colorimetric data input section 202 and a "spectral distribution form" corresponding to the image data acquired by the spectral distribution data input section 203.

In step S304, on the basis of the output system information acquired in step S302, information related to the output signal format of image data that can be processed by the output unit 208 is obtained. The output signal format means the signal format of image data that can be processed by the output unit 208 currently connected to the image processing unit 204, i.e., a "colorimetric form" corresponding to the signal format of image data that can be processed by the colorimetric processing output unit 209, the "colorimetric/spectral distribution form" corresponding to the signal format of image data that can be processed by the colorimetric/spectral distribution processing output unit 210, or the "spectral distribution form" corresponding to the signal format of image data that can be processed by the spectral distribution processing output unit 211.

In step S305, on the basis of the information related to the output signal format obtained in step S304, the signal format of image data to be output from the image processing unit 204 to the output unit 208 is determined. More specifically, when the colorimetric processing output unit 209 is connected as the output unit 208, the "colorimetric form" is determined. When the colorimetric/spectral distribution processing output unit 210 is connected, both the "colorimetric form" and the "spectral distribution form" are determined. When the spectral distribution processing output unit 211 is connected, the "spectral distribution form" is determined.

In step S306, image data having the output signal format determined in step S305 is selected from the image data acquired in step S300. The image data is output to the output unit 208 in step S307.

The image data output to the output unit 208 by the above steps has a signal format that matches the signal format that can be processed by the output unit 208. Hence, the output unit 208 can execute predetermined image processing on the basis of the image data received from the image processing unit 204 to generate an appropriate output signal and output the signal to an external device.

In the first embodiment, in accordance with the signal format that can be processed by the output unit 208 connected to the image processing unit 204, colorimetric data is output to the colorimetric processing output unit 209, both colorimetric data and spectral distribution data are output to the colorimetric/spectral distribution processing output unit 210, and spectral distribution data is output to the spectral distribution processing output unit 211.

As described above, according to the first embodiment, image data having a signal format that can be processed by the output unit 208 can be selected from image data acquired by the input unit 201 and supplied to the output unit 208. Hence, an image input apparatus in which the input signal format in the input unit 201 is not limited to the output signal format in the output unit 208 can be implemented. In other words, in an image input apparatus having the input unit 201 for inputting colorimetric data and spectral distribution data, one of the colorimetric processing output unit 209, colorimetric/spectral distribution processing output unit 210, and spectral distribution processing output unit 211 can be arbitrarily connected and used as the output unit 208.

Generally, as the colorimetric processing output unit 209, for example, a device for executing simple RGB data processing is assumed. However, as the colorimetric/spectral distribution processing output unit 210 or spectral distribution processing output unit 211, a multiple spectral distribution data processing device for realizing highly accurate color reproduction is assumed. Hence, according to the first embodiment, in the image input apparatus, a highly accurate color reproduction processing device (colorimetric/spectral distribution processing output unit or spectral distribution processing output unit) can be connected while maintaining the compatibility with an inexpensive normal device (colorimetric processing output unit).

Second Embodiment

The second embodiment of the present invention will be described below.

In the above-described first embodiment, an arrangement in which the input unit 201 has both the colorimetric data input section 202 and the spectral distribution data input section 203 has been described. In the second embodiment, only a spectral distribution data input section 203 is prepared as an input unit, and colorimetric data is generated in accordance with the output signal format of an output unit 208.

[Arrangement]

Figure 4:
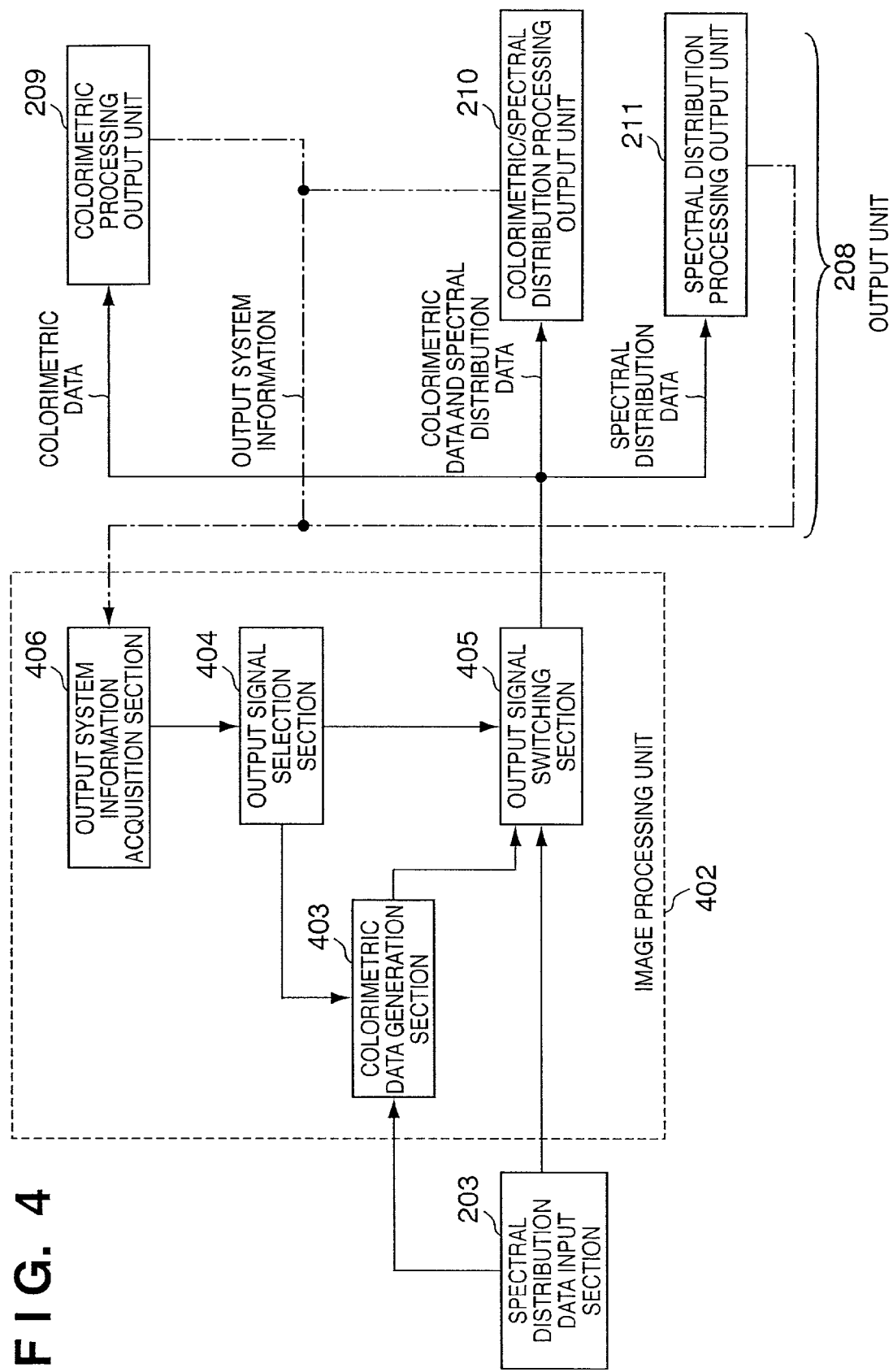
FIG. 4 is a block diagram showing the functional arrangement of an image input apparatus according to the second embodiment.

FIG. 4 is a block diagram showing the characteristic functional arrangement of an image input apparatus according to the second embodiment. The same reference numerals as in the above-described first embodiment denote the same components in FIG. 4, and a description thereof will be omitted.

The output signal selection section 207 in the first embodiment selects image data having a signal format to be output from image data having signal formats acquired by the input unit 201. However, an output signal selection section 404 in the second embodiment determines the signal format of image data to be output on the basis of the output signal format of the output unit 208 independently of the input signal format of an input unit 201.

As in the first embodiment, an output system information acquisition section 406 in an image processing unit 402 shown in FIG. 4 acquires the output system information of the output unit 208 (colorimetric processing output unit 209, colorimetric/spectral distribution processing output unit 210, or spectral distribution processing output unit 211) currently connected to the image processing unit 402. In the second embodiment, since only the spectral distribution data input section 203 is prepared as the input unit, no input system information acquisition section for acquiring input system information is prepared. However, an input system information acquisition section may be prepared, as in the first embodiment.

On the basis of the output system information acquired by the output system information acquisition section 406, the output signal selection section 404 determines the signal format of image data to be output from the image processing unit 402 to the output unit 208 from signal formats that are prepared in advance. The signal formats that are prepared in advance are the "colorimetric form", "colorimetric/spectral distribution form", and "spectral distribution form".

In the second embodiment, since only the spectral distribution data input section 203 is prepared as the input unit, no colorimetric data is input. Hence, when the "colorimetric form" or "colorimetric/spectral distribution form" is selected by the output signal selection section 404, a colorimetric data generation section 403 generates colorimetric data on the basis of spectral distribution data input from the spectral distribution data input section 203. The colorimetric data generation method will be described later in detail.

Upon receiving the spectral distribution data from the spectral distribution data input section 203 and the colorimetric data from the colorimetric data generation section 403, an output signal switching section 405 switches image data to be output from the image processing unit 402 on the basis of the output signal format determined by the output signal selection section 404. More specifically, when the output signal format is the "colorimetric form", the output signal switching section 405 outputs only the colorimetric data. When the output signal format is the "colorimetric/spectral distribution form", the output signal switching section 405 outputs both the colorimetric data and the spectral distribution data. When the output signal format is the "spectral distribution form", the output signal switching section 405 outputs only the spectral distribution data.

[Generation of Colorimetric Data]

The colorimetric data generation method by the colorimetric data generation section 403 will be described here.

As the first method, received spectral distribution data is temporarily converted into device-independent colorimetric vector data and then converted into colorimetric data on the target colorimetric system (e.g., RGB system).

Figure 5:
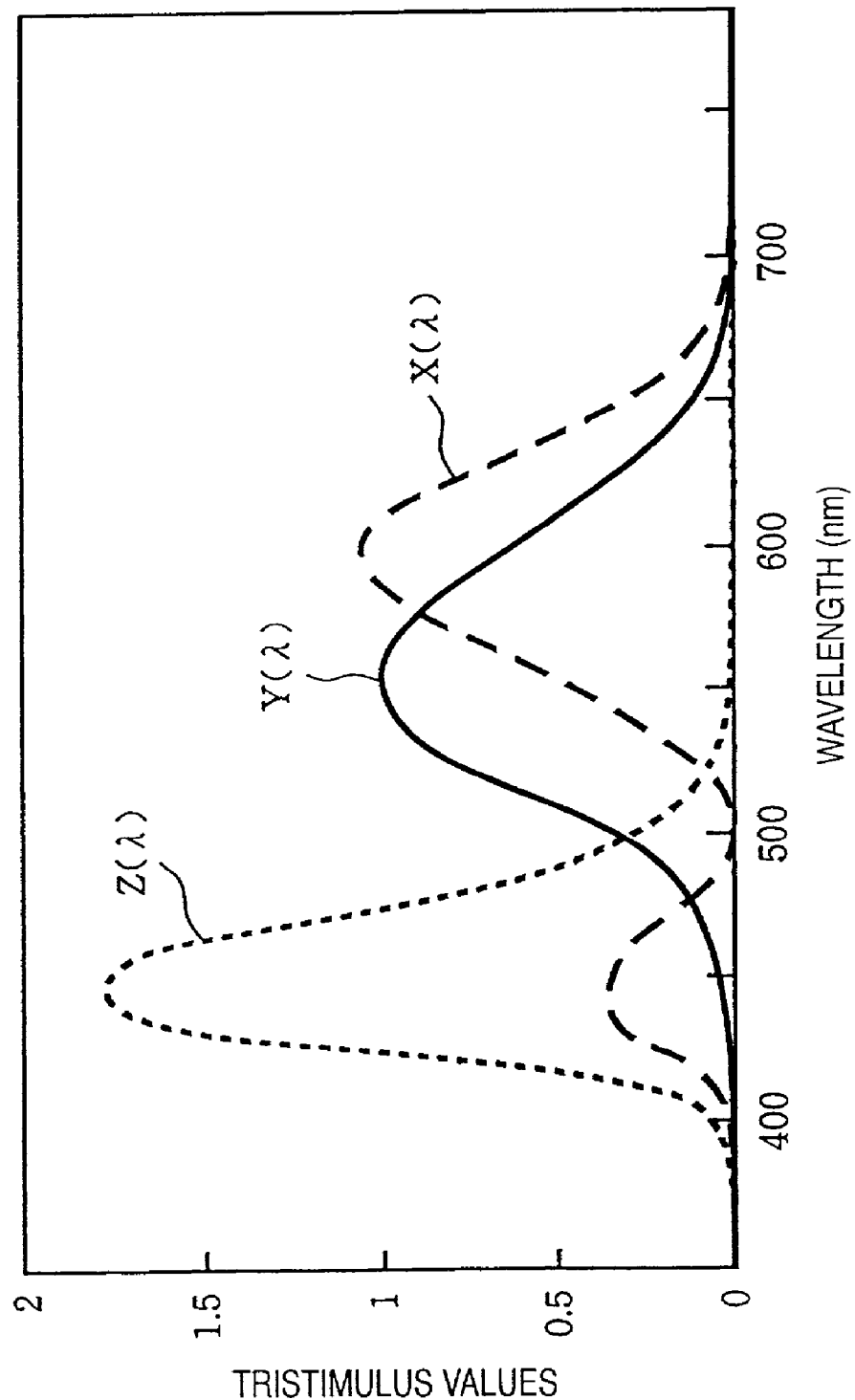
FIG. 5 is a graph showing examples of color matching functions.

That is, when spectral distribution data received from the spectral distribution data input section 203 is integrated by convolution calculation of a color matching function in an appropriately selected colorimetric system, the spectral distribution data can be converted into colorimetric vector data (tristimulus values) having ternary values. As colorimetric vector data having ternary values, a device-independent colorimetric system such as an L*a*b* colorimetric system or XYZ colorimetric system is generally employed. FIG. 5 is a graph showing examples of color matching functions in the XYZ colorimetric system.

As the second method, three data are selected from a plurality of wavelength data contained in the received spectral distribution data, and these data are converted into ternary values of colorimetric data.

Figure 6:
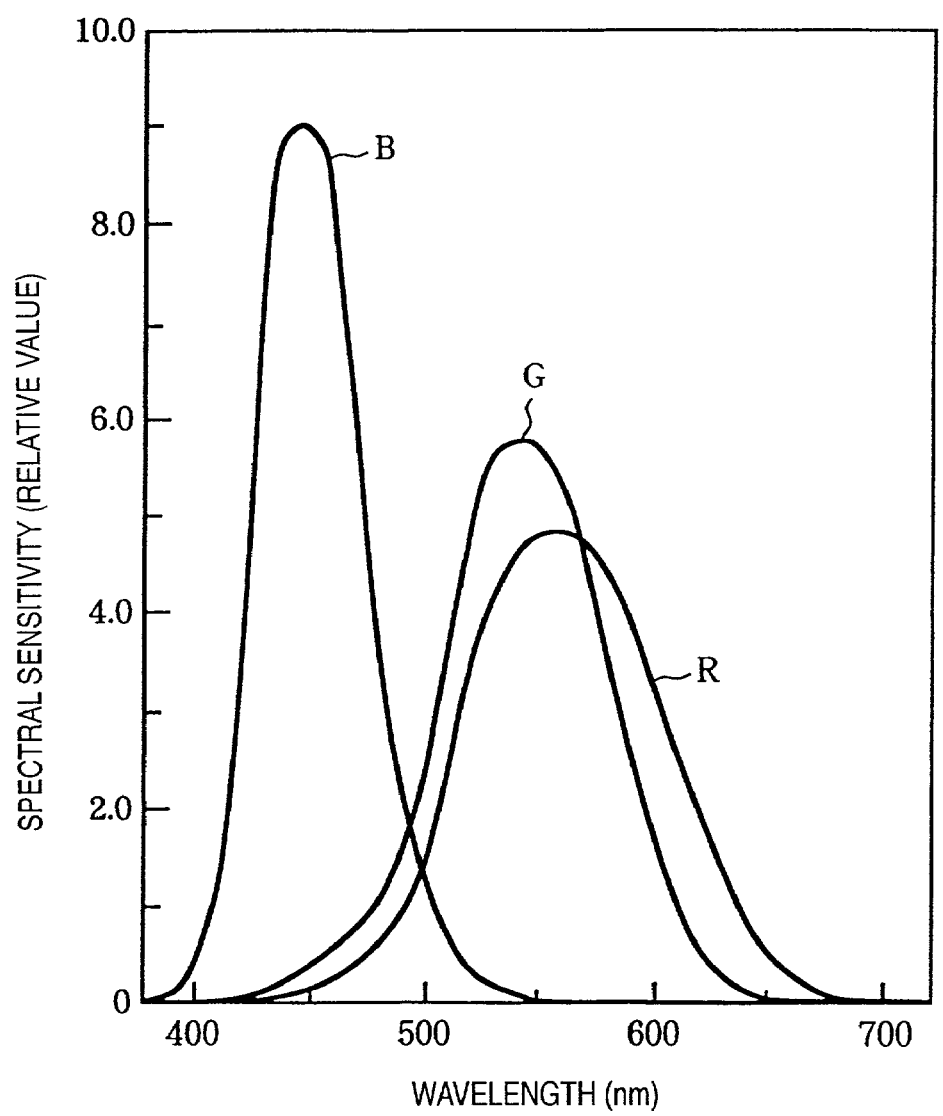
FIG. 6 is a graph showing an example of an RGB spectral distribution characteristic.

That is, the spectral characteristic of target colorimetric data is held in advance. Only data corresponding to the spectral characteristic of the colorimetric data are extracted from received spectral distribution data and converted into colorimetric data. For example, assume that colorimetric data contains RGB signals. Since RGB signals have spectral characteristics shown in FIG. 6, three wavelength data that exhibit the peaks of the RGB colors are extracted from the received spectral distribution data. On the basis of these data, RGB signal values can be generated.

As described above, according to the second embodiment, image data having an unacquired signal format is generated as needed, thereby outputting image data having a signal format that can be processed by the output unit 208. Hence, as in the first embodiment, in an image input apparatus for acquiring only spectral distribution data, one of the colorimetric processing output unit 209, colorimetric/spectral distribution processing output unit 210, and spectral distribution processing output unit 211 can be arbitrarily connected and used as the output unit 208.

OTHER EMBODIMENT

In the first embodiment, a case wherein the input unit 201 acquires colorimetric data and spectral distribution data has been described. In the second embodiment, a case wherein only spectral distribution data is acquired has been described. However, the present invention is not limited to these examples. FIG. 7 shows the correlation between the input signal format, the output signal format, and the signal format of image data to be output to the output unit. Referring to FIG. 7, the column wherein the input signal format is "colorimetric and spectral distribution form" corresponds to the above-described first embodiment, and the column wherein the input signal format is "spectral distribution form" corresponds to the second embodiment.

According to FIG. 7, when the input signal format is the "colorimetric form", i.e., when only colorimetric data is input from the input unit, no spectral distribution data can be formed on the basis of the colorimetric data. Hence, only when the output signal format is the "colorimetric form", appropriate image data (colorimetric data) can be output to the output unit. Otherwise, i.e., when the output signal format is the "colorimetric/spectral distribution form" or "spectral distribution form", image data having an appropriate signal format cannot be output to the output unit.

The correlation table shown in FIG. 7 is held in a memory (not shown) in the image input apparatus and looked up in, e.g., determining the output signal format on the basis of the signal formats of the input and output units in step S305 of FIG. 3. If the input signal format is the "colorimetric form", as described above, and the output signal has a form other than the "colorimetric form", i.e., when image data cannot be output to the output unit, the user is preferably notified of the error in step S305.

As described above, for all combinations of input and output signal formats, the signal format of corresponding image data is determined in advance. With this arrangement, not only as the output unit but also as the input unit, an input unit for receiving only colorimetric data, an input unit for receiving both colorimetric data and spectral distribution data, or an input unit for receiving only spectral distribution data can be arbitrarily connected to the image input apparatus and used.

Hence, the input and output units can be detached from the image input unit. Even when the attached input and output units use different signal formats, an appropriate image processing can be executed.

In the above-described embodiments, RGB data is most generally used as colorimetric data.

As many apparently widely different embodiments of the present invention can be made without departing from the spirit and scope thereof, it is to be understood that the invention is not limited to the specific embodiments thereof except as defined in the appended claims.

What is claimed is:

1. A method of performing color processing to output color data to an image processing unit, comprising the steps of:
   acquiring spectral data which indicates an input color;
   acquiring characteristic information of the image processing unit;
   determining a color data format of color data in accordance with the acquired characteristic information of the image processing unit to output the color data to the image processing unit;
   generating the color data having the determined color data format from the acquired spectral data; and
   outputting the generated color data to the image processing unit,
   wherein the color data format includes a spectral data format and a color component format which indicates a color using a plurality of color component data, and
   wherein said generating step includes calculating the plurality of color component data from the spectral data when the color component format is determined as the color data format in said determining step, and said outputting step includes outputting the acquired spectral data to the image processing unit when the spectral data format is determined as the color data format in said determining step.

2. The method according to claim 1, wherein the plurality of color component data are generated by convolution calculation of the spectral data and a color matching function.

3. The method according to claim 1, wherein the step of acquiring characteristic information includes acquiring the information, for which the color data format is determined, from the image processing unit.

4. A computer readable storage medium storing a computer program executed by a computer to perform a method of color processing to output color data to an image processing unit, the method comprising the steps of:
   acquiring spectral data which indicates an input color;
   acquiring characteristic information of the image processing unit;
   determining a color data format of color data in accordance with the acquired characteristic information of the image processing unit to output the color data to the image processing unit;
   generating the color data having the determined color data format from the acquired spectral data; and
   outputting the generated color data to the image processing unit,
   wherein the color data format includes a spectral data format and a color component format which indicates a color using a plurality of color component data, and wherein said generating step includes calculating the plurality of color component data from the spectral data when the color component format is determined as the color data format in said determining step, and said outputting step includes outputting the acquired spectral data to the image processing unit when the spectral data format is determined as the color data format in said determining step.

5. An image processing apparatus for performing color processing to output color data to an image processing unit, comprising:

an acquiring section, arranged to obtain spectral data which indicates an input color and to acquire characteristic information of the image processing unit;

a determiner, arranged to determine a color data format of color data in accordance with the acquired characteristic information of the image processing unit to output the color data to the image processing unit;

a generator, arranged to generate the color data having the determined color data format from the acquired spectral data; and an outputting section, arranged to output the generated color data to the image processing unit, wherein the color data format includes a spectral data format and a color component format which indicates a color using a plurality of color component data, and wherein said generator calculates the plurality of color component data from the spectral data when the color component format is determined as the color data format by said determiner, and said outputting section outputs the acquired spectral data to the image processing unit when the spectral data format is determined as the color data format in said determiner.

* * * * *